Patented Jan. 20, 1942

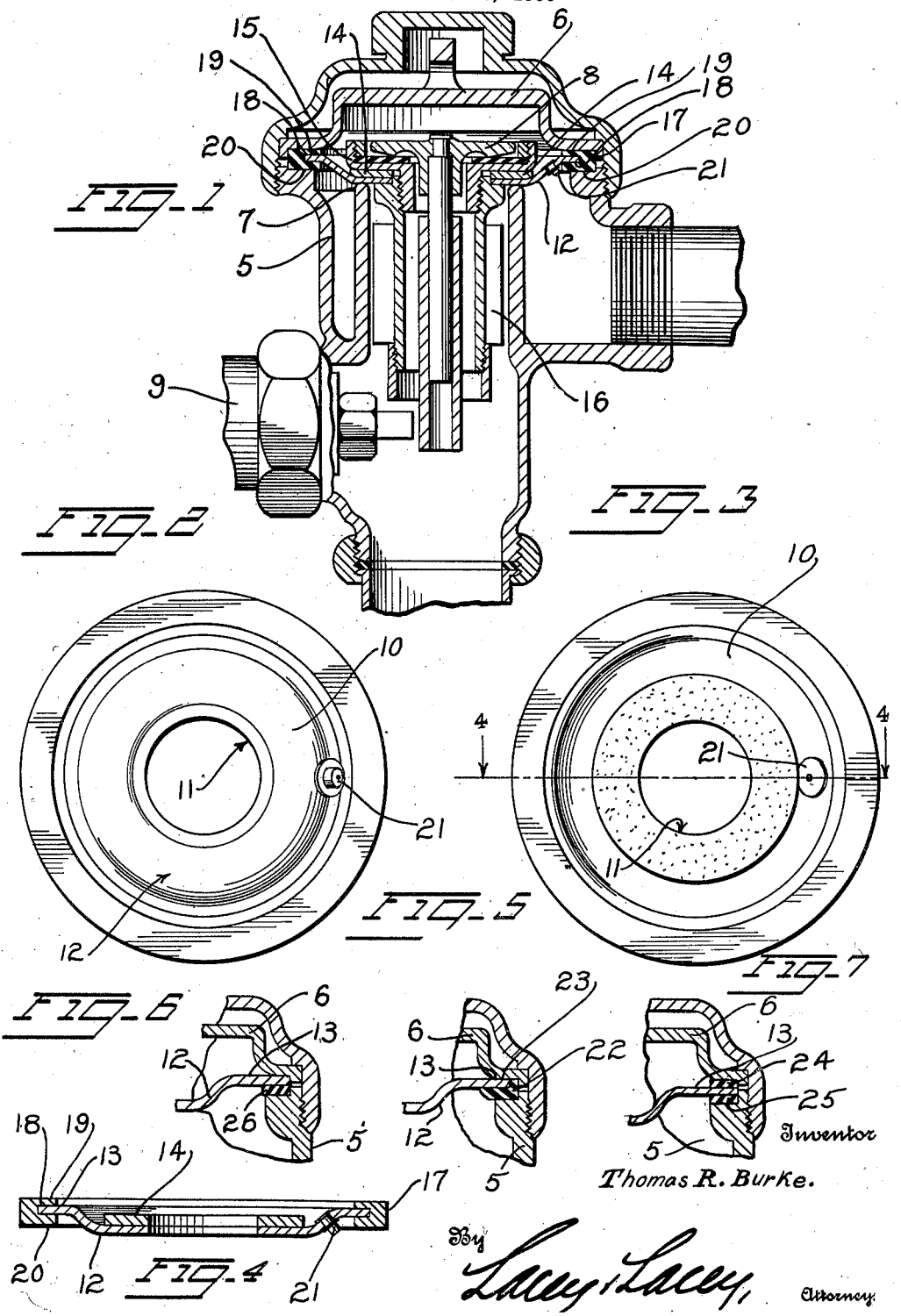

2,270,259

UNITED STATES PATENT OFFICE 2,270,259

DIAPHRAGM FOR CLOSET FLUSH VALVES

Thomas R. Burke, New York, N. Y.

Application December 14, 1939, Serial No. 309,272

7 Claims. (Cl. 137—93)

This invention relates to flush valves for closet bowls and more particularly to a replacement diaphragm especially designed for use on "Sloan Royal Flush Valves."

The object of the invention is to provide a composite diaphragm of durable construction which will give efficient service for an indefinite period without appreciable deterioration, thereby obviating the necessity of frequent renewal or replacement of the diaphragm and consequently effecting a material saving in time, labor and expense incident to such replacements.

A further object of the invention is to provide a diaphragm formed of separable units adapted to take the place of the usual one piece diaphragm so as to permit replacement of either unit if worn or damaged without the necessity of replacing or renewing the unworn or undamaged unit.

A further object of the invention is to provide a diaphragm comprising a flexing member or body portion of pliable material, such as leather, and a detachable and reversible sealing gasket formed of rubber or other yieldable material.

A further object is to provide a diaphragm having a central reinforcement on one side thereof for preventing lateral movement or distortion of the flexing member incident to vibration tendencies in the valve parts normally attached to said flexing member.

A further object is to form the yieldable gasket with a channel adapted to detachably receive the peripheral edge of the flexing member, said channel being offset with respect to the center of the inner edge of the gasket to provide upper and lower yieldable clamping lips of different thicknesses and which lips, if desired, may also be made in different widths, thereby to control the flexure of the body of the diaphragm.

A still further object of the invention is generally to improve this class of devices so as to increase their utility, durablity and efficiency.

In the accompanying drawing forming a part of this specification and in which similar numerals of reference indicate corresponding parts in all the figures of the drawing:

Figure 1 is a vertical sectional view, partly in elevation, of a standard flush valve provided with a diaphragm embodying the present invention, Figure 2 is a bottom plan view of the diaphragm removed, Figure 3 is a top plan view thereof, Figure 4 is a transverse sectional view taken on the line 4—4 of Figure 3, Figure 5 is a detail sectional view illustrating a modified form of the invention, and Figures 6 and 7 illustrate further modifications.

The improved diaphragm forming the subject-matter of the present invention is especially designed for use on "Sloan Royal Flush Valves," and by way of illustration is shown in connection with such a valve, in which 5 designates the valve body, 6 the inner cover, 7 the main valve seat and 8 the tilt valve operable by the handle 9.

The device comprises a flexing member or body portion 10 formed of pliable material, preferably leather, having its central portion provided with a circular opening 11 to accommodate the adjacent valve parts, said flexing member being formed with a concavo-convex portion 12 surrounding the opening 11 and defining a flat peripheral edge, indicated at 13. Secured to the concave face of the portion 10 by cement, stitching or otherwise is an annular reinforcing member 14, preferably formed of leather, of greater toughness than the leather of the body portion and against which the disk 15 of the valve bears. This annular reinforcing member serves to prevent side sway or distortion of the flexing member around the opening 11 therein incident to tugging and vibration tendencies in the valve parts to which the diaphragm is attached and which occur during flow and tend to become pronounced at high flow rates, due to high pressure and consequently holds the valve guide truly concentric with the inner wall of the valve barrel, thereby preventing chattering noise due to striking of the guide wings 16 against the barrel of the valve.

Fitted to the outer edge 13 of the flexing member or body portion 10 is a detachable sealing or clamping gasket 17 preferably formed of rubber or other yieldable material, said gasket being provided with a channel 18 preferably offset with respect to the center of the inner edge of the gasket to provide yieldable upper and lower inwardly extending clamping lips 19 and 20 of different thicknesses, as best shown in Figure 4 of the drawing. Inasmuch as the gasket 17 is detachably mounted on the peripheral edge of the flexing member, said gasket may be readily removed and replaced when necessary or the position of the old gasket may be reversed so as to bring the thick lip uppermost. It will be noted that, when the diaphragm is in position on the flush valve and the parts thereof tightened, the pressure exerted on the gasket will prevent displacement thereof and at the same time press the yieldable lips of said gasket into clamping engagement with the opposite faces of the flexing member or body portion. The lips 19 and 20 are preferably of the same width and by making said lips of a greater or less width the degree of flexure of the body portion of the diaphragm may be controlled at will by the mechanic to more or less adapt the diaphragm to various conditions of water pressure prevailing at the installation as well as to characteristics appearing in the closet bowl relative to ease or difficulty of siphoning, as the case may be.

By making the outer edge of the gasket thicker, additional means for regulating the quantity of flush water is obtained inasmuch as by increasing the thickness of said gasket, the elevation of the outer edge of the diaphragm is changed relative to the main valve seat and other parts of said valve, and as the standard "Sloan" flush valve has no readily available means for regulation or timing the duration of the flush water, this is a desirable feature of the invention.

It should be noted that the diaphragm receiving channel of the gasket is off center so that the projecting lip on one side of the gasket is thicker than the other. By positioning the gasket on the diaphragm with the thick lip uppermost, the upward travel of the diaphragm is curtailed and a somewhat shorter duration of flush is consequently obtained while by reversing the gasket and positioning said gasket on the diaphragm with the thin lip uppermost the upward travel of the diaphragm is increased and the duration of the flush is correspondingly increased. It will, furthermore, be noted that the closer the upper lip is extended towards the center of the diaphragm the more it will interfere with the upward flexing thereof and the shorter the flush will be while by making said lip shorter the range of upward flexing of the diaphragm is increased and the duration of flush correspondingly increased. It will thus be seen that the present invention provides a composite diaphragm in which the main body portion thereof is formed of tough pliable leather and the outer edge of rubber detachably fitted thereto to form a gasket having clamping lips of different thicknesses, the central portion of the diaphragm being provided with a reinforcing member to prevent side sway and distortion of said diaphragm incident to vibration or tugging action of the valve parts to which the diaphragm is attached. It will, of course, be understood that the diaphragms will be provided with the usual by-pass 21 preferably disposed between the gasket and reinforcing member, as shown.

In Figure 5 of the drawing, there is illustrated a modified form of the invention, in which the gasket 22 is dadoed, as indicated at 23, instead of being provided with the annular receiving channel previously mentioned. In this form of the device, the gasket 22 may be either cemented to the body of the diaphragm or loosely connected therewith so as to permit the gasket to be detached and reversed when desired. When the gasket 22 is loosely fitted to the diaphragm, the pressure of the valve parts thereon will hold the gasket to its seat so as to prevent accidental displacement of said gasket when the valve is in operation.

In Figure 6 of the drawing, there is illustrated another modification in which upper and lower separable gaskets 24 and 25 are provided and the outer edge of the diaphragm is extended between the gaskets to the outer edges thereof. If desired, however, a single gasket 26 may be detachably or otherwise fitted to the lower face of the diaphragm at the outer edge thereof, as illustrated in Figure 7 of the drawing.

It has been found in actual practice that diaphragms constructed of rubber oxidize rapidly and cast off sloughings and slimy matter which tend to clutter the upper chamber of the flush valve and interfere with the proper functioning thereof. By making the body or flexing member of leather, this objectionable feature is effectively overcome as leather does not become fouled with excrescences, as rubber does, yet permits perfect flexing of the diaphragm and materially increases the effective life thereof while the rubber gasket insures a water-tight seal between the parts when the diaphragm is clamped in position on the flush valve.

While the diaphragm is particularly designed for use in connection with a "Sloan" flush valve, it will, of course, be understood that said diaphragm may be used with equally good results on any other type of valve to which it may be applicable. It will, furthermore, be understood that the diaphragms may be made in different sizes and shapes and constructed of any desired material without departing from the spirit of the invention.

Having thus described the invention, what is claimed as new is:

1. A diaphragm for flush valves comprising a pliable body portion, a freely removable and reversible annular gasket of yieldable material detachably fitting the peripheral edge of the body portion and provided with a channel offset with respect to the center of the inner edge of said gasket to receive said peripheral edge and provide upper and lower inwardly extending resilient lips of different thicknesses.

2. A diaphragm for flush valves comprising a leather body portion, and an annular gasket of yieldable material entirely surrounding the peripheral edge of the body portion and freely separable therefrom, the inner edge of the gasket being provided with a channel offset with respect to the center of said inner edge to receive the peripheral edge of the body portion and defining upper and lower inwardly extending lips of different thicknesses.

3. A diaphragm for flush valves comprising an annular concavo-convex leather body portion having a central opening therein, an annular leather reinforcing member secured to the concave side of the body portion around said opening and having its upper face disposed entirely within the lines of the concave side of said body portion, and an annular gasket having its inner edge formed with a circumferential channel detachably receiving the adjacent edge of the body portion, said channel defining upper and lower inwardly extending lips of different thicknesses projecting over and bearing against said body portion.

4. A diaphragm for flush valves comprising a pliable concavo-convex body portion having a central opening therein and provided with a straight marginal edge, an annular reinforcing member secured to the concave side of the body portion around the opening therein and having its upper surface disposed in a plane below the plane of said marginal edge, and a resilient gasket having its inner edge provided with a circumferential channel adapted to detachably receive the straight edge of the pliable body portion, said channel defining upper and lower inwardly extending lips of different thicknesses.

5. A diaphragm for flush valves comprising a substantially circular leather body portion having a central opening formed therein, a leather reinforcing member of greater toughness than the leather of the body portion secured thereto and surrounding the opening therein, and a reversible gasket detachably fitted to the peripheral edge of the leather body portion and provided with a channel detachably receiving the peripheral edge of the body portion, said channel being offset with respect to the center of the inner wall of the gasket to form upper and lower lips of different thicknesses.

6. The combination with a flush valve including a casing, inner cover, tilt valve seat and main valve seat, of a flexible diaphragm interposed between the main valve seat and tilt valve seat, and a yieldable gasket fitted to the outer marginal portion of the flexible diaphragm and clamped between the casing and inner cover, said gasket being provided with an inwardly extending lip for regulating the flexure of said diaphragm towards the ceiling of said inner cover.

7. The combination with a flush valve including a casing, inner cover, tilt valve seat and main valve seat, of a leather diaphragm interposed between the main valve seat and tilt valve seat, and a gasket detachably fitted to the outer margin of the diaphragm and clamped between the casing and inner cover, said gasket being provided with inwardly extending lips for regulating the flexure of the diaphragm towards the ceiling of said inner cover.

THOMAS R. BURKE.